United States Patent [19]
Giallorenzi et al.

[11] Patent Number: 6,091,760
[45] Date of Patent: Jul. 18, 2000

[54] NON-RECURSIVELY GENERATED ORTHOGONAL PN CODES FOR VARIABLE RATE CDMA

[75] Inventors: Thomas R Giallorenzi, Herriman; Samuel C Kingston, Salt Lake City; Lee A Butterfield, W. Jordan; William T Ralston, Riverton; Leon L Nieczyporowicz, West Jordan; Alan E Lundquist, Salt Lake City, all of Utah

[73] Assignee: L-3 Communications Corporation, New York, N.Y.

[21] Appl. No.: 09/329,473

[22] Filed: Jun. 10, 1999

Related U.S. Application Data

[63] Continuation-in-part of application No. 09/328,546, Jun. 9, 1999.
[60] Provisional application No. 60/091,070, Jun. 29, 1998.
[51] Int. Cl.$^7$ .................................................. H04B 7/216
[52] U.S. Cl. ........................ 375/140; 370/208; 370/342
[58] Field of Search .................................... 375/130, 140, 375/141, 145, 146; 370/203, 208, 320, 335, 342, 441, 479

[56] References Cited

U.S. PATENT DOCUMENTS

| | | | |
|---|---|---|---|
| 3,810,019 | 5/1974 | Miller | 375/260 |
| 5,151,919 | 9/1992 | Dent | 375/1 |
| 5,204,876 | 4/1993 | Bruckert et al. | 375/1 |
| 5,329,547 | 7/1994 | Ling | 375/1 |
| 5,418,813 | 5/1995 | Schaffner et al. | 375/205 |
| 5,442,625 | 8/1995 | Gitlin et al. | 370/18 |
| 5,515,396 | 5/1996 | Dalekotzin | 375/206 |
| 5,548,613 | 8/1996 | Kaku et al. | 375/208 |
| 5,659,573 | 8/1997 | Bruckert et al. | 375/200 |
| 5,729,124 | 3/1998 | Lu | 324/76.24 |
| 5,748,668 | 5/1998 | Tomita et al. | 375/200 |
| 5,751,761 | 5/1998 | Gilhousen | 375/200 |
| 5,757,767 | 5/1998 | Zehavi | 370/208 |
| 5,805,567 | 9/1998 | Ramesh | 370/204 |
| 5,805,584 | 9/1998 | Kingston et al. | 370/342 |
| 5,825,835 | 10/1998 | Kingston et al. | 375/367 |
| 5,851,187 | 12/1998 | Thomas, III et al. | 600/447 |
| 5,864,548 | 1/1999 | Liu | 370/320 |
| 5,926,488 | 7/1999 | Khayrallah | 371/37.01 |
| 5,936,972 | 8/1999 | Meidan et al. | 371/20.1 |
| 5,995,807 | 11/1999 | Magnier et al. | 455/67.6 |

OTHER PUBLICATIONS

Multiplexing Of Telephone Signals By Walsh Functions, Davidson, I.A., Applications Of Walsh Functios, 1971 Proceedings, Apr. 13, 1971, pp. 177–179.

"Multiplex Systems Using Sums Of Walsh Functions As Carriers", Hubner, H., Applications Of Walsh Functions, 1971 Proceedings, Apr. 13 1971, pp. 180–191.

"The Use Of Walsh Functions For Multiplexing Signals", Davidson, I.A., Applications Of Walsh Functions, 1970 Proceedings, pp. 23–25.

"On The Transmission Of Walsh Modulated Multiplex Signals", Hubner H., Applications Of Walsh Functions, 1970 Proceedings, pp. 41–45.

"Analog And Digital Multiplexing By Means Of Walsh Functions", Hubner, H., Applications Of Walsh Functions, 1970 Proceedings, pp. 238–247.

*Primary Examiner*—Young T. Tse
*Attorney, Agent, or Firm*—Perman & Green, LLP

[57] ABSTRACT

A method and apparatus for constructing a series of PN code sets that can be used for multirate synchronous and quasi-synchronous CDMA systems. The construction technique produces PN codes that are balanced, and that furthermore do not require any synchronization of neighboring base stations. The method is a non-recursive method that uses a permuted orthogonal matrix to modulate permuted orthogonal matrices to create PN codes that support multirate operation. Furthermore, the codes constructed using the method have very good spectral properties (if chosen properly) when the code length, n, is reasonably large.

20 Claims, 13 Drawing Sheets

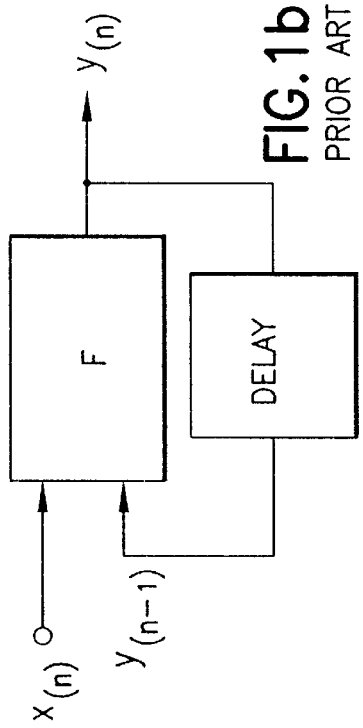

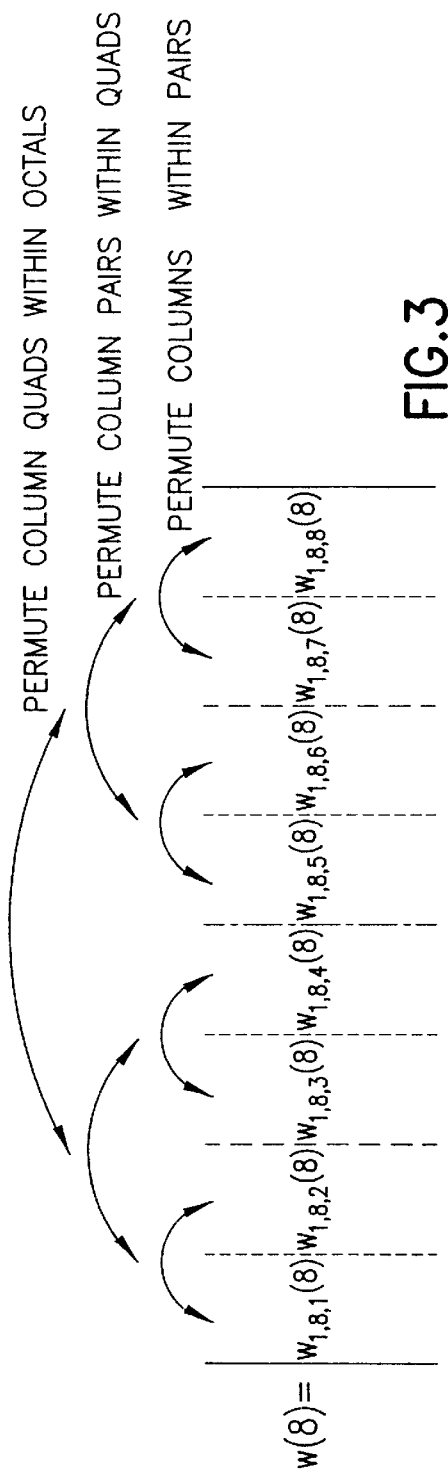
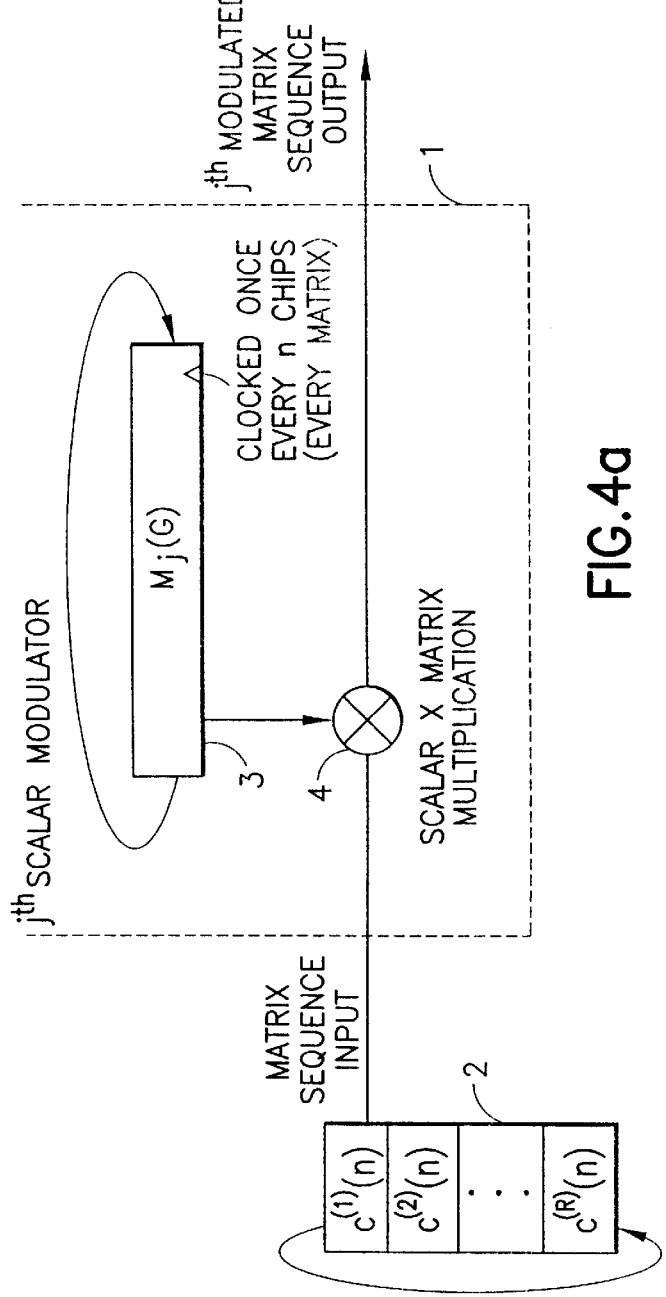
FIG.3
FIG.4a

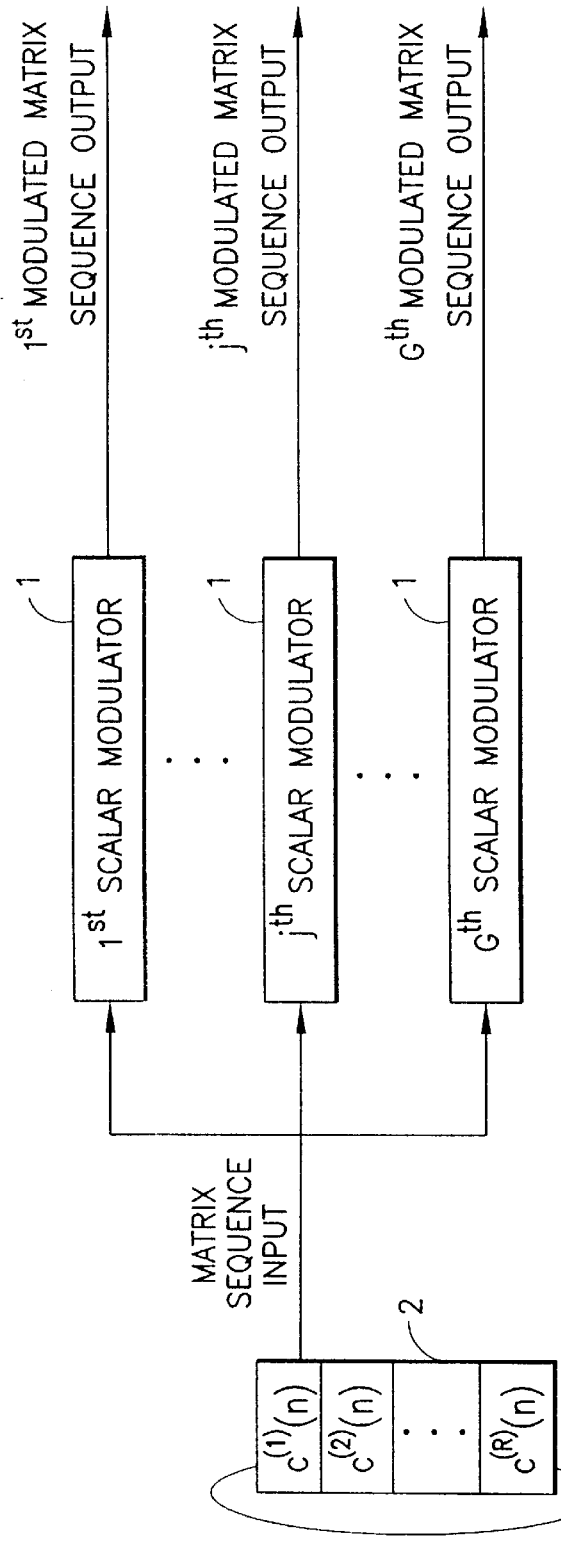

$$D^{(1)} = \begin{vmatrix} c^{(1)}(n) & c^{(2)}(n) & c^{(3)}(n) & -c^{(1)}(n) & -c^{(2)}(n) & -c^{(3)}(n) & c^{(1)}(n) & c^{(2)}(n) & c^{(3)}(n) & c^{(1)}(n) & c^{(2)}(n) & c^{(3)}(n) \\ -c^{(1)}(n) & -c^{(2)}(n) & -c^{(3)}(n) & c^{(1)}(n) & c^{(2)}(n) & c^{(3)}(n) & c^{(1)}(n) & -c^{(2)}(n) & -c^{(3)}(n) & -c^{(1)}(n) & -c^{(2)}(n) & -c^{(3)}(n) \\ c^{(1)}(n) & c^{(2)}(n) & c^{(3)}(n) & c^{(1)}(n) & c^{(2)}(n) & -c^{(3)}(n) & c^{(1)}(n) & c^{(2)}(n) & -c^{(3)}(n) & c^{(1)}(n) & c^{(2)}(n) & c^{(3)}(n) \\ -c^{(1)}(n) & -c^{(2)}(n) & -c^{(3)}(n) & -c^{(1)}(n) & -c^{(2)}(n) & c^{(3)}(n) & c^{(1)}(n) & c^{(2)}(n) & c^{(3)}(n) & -c^{(1)}(n) & -c^{(2)}(n) & -c^{(3)}(n) \end{vmatrix}$$

FIG. 6a (EQUATION 10)

| | | | | | | | | |
|---|---|---|---|---|---|---|---|---|
| $M_1(4)$ | $c^{(1)}(n)$ | $c^{(2)}(n)$ | $c^{(3)}(n)$ | $c^{(1)}(n)$ | $c^{(2)}(n)$ | $c^{(3)}(n)$ | $c^{(1)}(n)$ | $c^{(2)}(n)$ | $c^{(3)}(n)$ |

FIRST ROW OF EQ.10 HIGHEST DATA RATE

| | | | | | | | | |
|---|---|---|---|---|---|---|---|---|
| $M_1(4)$ | $c^{(1)}(n)$ | $c^{(2)}(n)$ | $c^{(3)}(n)$ | $c^{(1)}(n)$ | $c^{(2)}(n)$ | $c^{(3)}(n)$ | $c^{(1)}(n)$ | $c^{(2)}(n)$ | $c^{(3)}(n)$ |
| $M_2(4)$ | $-c^{(1)}(n)$ | $-c^{(2)}(n)$ | $c^{(3)}(n)$ | $c^{(1)}(n)$ | $-c^{(2)}(n)$ | $-c^{(3)}(n)$ | $c^{(1)}(n)$ | $c^{(2)}(n)$ | $-c^{(3)}(n)$ |

FIRST TWO ROWS OF EQ.10 NEXT HIGHEST DATA RATE

| | | | | | | | | |
|---|---|---|---|---|---|---|---|---|
| $M_1(4)$ | $c^{(1)}(n)$ | $c^{(2)}(n)$ | $c^{(3)}(n)$ | $c^{(1)}(n)$ | $c^{(2)}(n)$ | $c^{(3)}(n)$ | $c^{(1)}(n)$ | $c^{(2)}(n)$ | $c^{(3)}(n)$ |
| $M_2(4)$ | $-c^{(1)}(n)$ | $-c^{(2)}(n)$ | $c^{(3)}(n)$ | $c^{(1)}(n)$ | $-c^{(2)}(n)$ | $-c^{(3)}(n)$ | $c^{(1)}(n)$ | $c^{(2)}(n)$ | $-c^{(3)}(n)$ |
| $M_3(4)$ | $-c^{(1)}(n)$ | $c^{(2)}(n)$ | $-c^{(3)}(n)$ | $-c^{(1)}(n)$ | $c^{(2)}(n)$ | $c^{(3)}(n)$ | $-c^{(1)}(n)$ | $c^{(2)}(n)$ | $-c^{(3)}(n)$ |
| $M_4(4)$ | $-c^{(1)}(n)$ | $-c^{(2)}(n)$ | $c^{(3)}(n)$ | $-c^{(1)}(n)$ | $c^{(2)}(n)$ | $-c^{(3)}(n)$ | $-c^{(1)}(n)$ | $c^{(2)}(n)$ | $-c^{(3)}(n)$ |

ALL ROWS OF EQ.10 LOWEST DATA RATE

FIG.6b

| | SYMBOL 1 | SYMBOL 2 | SYMBOL 3 | SYMBOL 4 | SYMBOL 5 | SYMBOL 6 |
|---|---|---|---|---|---|---|
| Codes at rate Rc/n (cell 1) | $c^{(1)}(n)$ | $c^{(2)}(n)$ | $c^{(3)}(n)$ | $c^{(1)}(n)$ | $c^{(2)}(n)$ | $c^{(3)}(n)$ |
| | SYMBOL 1 | | SYMBOL 2 | | SYMBOL 3 | |
| Codes at rate Rc/2n (cell 1) | $c^{(1)}(n)$ $c^{(1)}(n)$ | $c^{(2)}(n)$ $c^{(2)}(n)$ | $c^{(3)}(n)$ $c^{(3)}(n)$ | $c^{(1)}(n)$ $c^{(1)}(n)$ | $c^{(2)}(n)$ $c^{(2)}(n)$ | $c^{(3)}(n)$ $c^{(3)}(n)$ |
| Codes at rate Rc/2n (cell 1) | $c^{(1)}(n)$ $-c^{(1)}(n)$ | $c^{(2)}(n)$ $-c^{(2)}(n)$ | $c^{(3)}(n)$ $-c^{(3)}(n)$ | $c^{(1)}(n)$ $-c^{(1)}(n)$ | $c^{(2)}(n)$ $-c^{(2)}(n)$ | $c^{(3)}(n)$ $-c^{(3)}(n)$ |

| | SYMBOL 1 | SYMBOL 2 | SYMBOL 3 | SYMBOL 4 | SYMBOL 5 | SYMBOL 6 |
|---|---|---|---|---|---|---|
| Codes at rate Rc/n (cell 2) | $c^{(4)}(n)$ | $c^{(5)}(n)$ | $c^{(6)}(n)$ | $c^{(4)}(n)$ | $c^{(5)}(n)$ | $c^{(6)}(n)$ |
| | SYMBOL 1 | | SYMBOL 2 | | SYMBOL 3 | |
| Codes at rate Rc/2n (cell 2) | $c^{(4)}(n)$ $c^{(4)}(n)$ | $c^{(5)}(n)$ $c^{(5)}(n)$ | $c^{(6)}(n)$ $c^{(6)}(n)$ | $c^{(4)}(n)$ $c^{(4)}(n)$ | $c^{(5)}(n)$ $c^{(5)}(n)$ | $c^{(6)}(n)$ $c^{(6)}(n)$ |
| Codes at rate Rc/2n (cell 2) | $c^{(4)}(n)$ $-c^{(4)}(n)$ | $c^{(5)}(n)$ $-c^{(5)}(n)$ | $c^{(6)}(n)$ $-c^{(6)}(n)$ | $c^{(4)}(n)$ $-c^{(4)}(n)$ | $c^{(5)}(n)$ $-c^{(5)}(n)$ | $c^{(6)}(n)$ $-c^{(6)}(n)$ |

TIME →

FIG.7

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

$$RC = [3 \quad 1 \quad 2 \quad 4]$$

$$RH_4 = \begin{bmatrix} 1 & 1 & 1 & 1 \\ 1 & 1 & -1 & -1 \\ -1 & 1 & 1 & -1 \\ -1 & 1 & -1 & 1 \end{bmatrix}$$

$$Reordering\_code = \begin{bmatrix} 3 & 5 & 2 & 7 & 1 & 8 & 4 & 6 \end{bmatrix}$$

$$Walsh\_code = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

$$Reordered\_code = \begin{bmatrix} 1 & 1 & 1 & 1 & 1 & 1 & 1 & 1 \\ 1 & 1 & -1 & 1 & 1 & -1 & -1 & -1 \\ -1 & 1 & 1 & -1 & 1 & -1 & -1 & 1 \\ -1 & 1 & -1 & -1 & 1 & 1 & 1 & -1 \\ 1 & -1 & 1 & -1 & 1 & -1 & 1 & -1 \\ 1 & -1 & -1 & -1 & 1 & 1 & -1 & 1 \\ -1 & -1 & 1 & 1 & 1 & 1 & -1 & -1 \\ -1 & -1 & -1 & 1 & 1 & -1 & 1 & 1 \end{bmatrix}$$

Inversion_pattern=

Reordered_code_w_inversion=

NON-RECURSIVELY GENERATED ORTHOGONAL PN CODES FOR VARIABLE RATE CDMA

CROSS-REFERENCE TO A RELATED PATENT APPLICATION

This patent application is a continuation-in-part of copending and commonly assigned U.S. patent application Ser. No. 09/328,546, filed Jun. 9, 1999 as Express Mail No.: EL 067 101 377 US, entitled "PN Code Selection for Synchronous CDMA", by Leon Nieczyporowicz, Thomas Giallorenzi and Steven B. Perkins, which in turn claims priority under 35 U.S.C. §119(e) from Provisional Patent Application 60/091,070, filed Jun. 29, 1998, entitled "PN Code Selection for Synchronous CDMA", by Leon Nieczyporowicz, Thomas Giallorenzi and Steven B. Perkins. The disclosure of these two patent applications is incorporated by reference herein in their entireties.

FIELD OF THE INVENTION

This invention is generally related to telecommunications systems and apparatus that employ spreading codes and, in particular, relates to methods and apparatus for generating a set of spreading codes that are optimized for a multi-user, multi-rate environment.

BACKGROUND OF THE INVENTION

In the forward direction of a Code Division, Multiple Access (CDMA) system, i.e., from a base station or base unit to a subscriber unit, it is relatively easy to synchronize the pseudonoise (PN) codes of the various channels, since they are all created at and transmitted from the same base station. It is furthermore very easy to time-align the chips and symbols of the constituent signals within the aggregate waveform. As a result, the forward channel of most CDMA systems utilizes some form of synchronous CDMA. In some systems, such as a fixed wireless local loop telephone system known as Primewave 2000™ available from the assignee of this patent application, the reverse channel (i.e., subscriber unit to base station) is also quasi-synchronous. In this type of system, a timing control loop is utilized to maintain the various users in the system time-aligned such that their respective signals all arrive at the base station within a small fraction of a chip of each other.

Whenever synchronous or quasi-synchronous CDMA is employed, it becomes possible to use PN codes which are designed to have the smallest possible cross-correlation when time-aligned with each other. If the number of users in the system is less than the number of chips transmitted for each channel symbol (which may be referred to as the channel symbol processing gain), then it is possible to design PN codes that are truly orthogonal to each other. When the number of users exceeds the channel symbol processing gain, then it is no longer possible to design codes that are orthogonal, since the dimensionality of the signaling space has been exceeded. For this reason, it is possible for synchronous and quasi-synchronous CDMA systems to support a number of users equal to the channel symbol processing gain, as long as the links have adequately large power and adequately low interference resulting from distortions such as clipping, multipath, filtering and timing offsets.

It is often desirable for the system to support users which are not all at the same signaling rate. For example, in a system where some users are using a telephone and the required date rate is on the order of a few thousand bits per second (Kbps) to a few tens of Kbps, while other users are using the system as a computer network interface and require a million bits per second (Mbps) or more, the waveform should to be able to simultaneously accommodate the various non-homogeneous users.

It is possible to support a high rate user by allocating to him or her a plurality of parallel, lower rate channels, but this approach requires that the high rate users have a plurality of transmitters and receivers. As such, this approach is less than desirable in many systems where cost is an important consideration.

A more cost-effective technique to support high rate and low rate users simultaneously is to employ a common chipping rate for all users, but to permit the users in the system to vary their channel symbol processing gains depending on their respective data rate. This implies that if one desires that all users in either the forward, or the forward and reverse channels, to be orthogonal to each other, independent of their rates, then a set of PN codes are needed of various lengths, and that are mutually orthogonal when synchronized appropriately.

Walsh functions are a set of binary and orthogonal waveforms that can be used for signal multiplexing purposes, and have long been recognized as having application to telephony. Reference in this regard can be had to an article entitled "The Multiplexing of Telephone Signals by Walsh Functions", by I. A. Davidson in Applications of Walsh Functions, 1971 proceedings, Second Edition, Eds. R. W. Zeek and A. E. Showalter, pages 177–179.

Of the number of possible sets of orthogonal functions that can be used as carriers in multiplex transmission, the category of the completely orthogonal Hadamard functions have also been long recognized as being particularly well suited for technical applications, including telephony applications. In general, Walsh functions are special Hadamard functions, and can be described by Hadamard matrices with powers of 2 as ordinary numbers. Further function systems can be derived from Hadamard matrices by permutation of columns and rows and by sign inversion, while preserving their orthogonal characteristics.

One method for creating PN codes which are mutually orthogonal is to use a recursive construction technique defined by H. Hubner, "Multiplex Systems Using Sums of Walsh Functions as Carriers", also in Applications of Walsh Functions, 1971 proceedings, Second Edition, pages 180–191.

Reference in this regard can also be had to U.S. Pat. No. 5,571,761, entitled "System and Method for Orthogonal Spread Spectrum Sequence Generation in Variable Data Rate Systems", by Klein S. Gilhousen.

These approaches are based upon the Walsh-Hadamard construction technique defined as follows:

$$w(2n) = \begin{vmatrix} w(n) & w(n) \\ w(n) & -w(n) \end{vmatrix} \quad (1)$$

where w(n) is an n x n matrix of ±1 values. If one defines w(1)=1, then it follows that, $$w(2) = \begin{vmatrix} +1 & +1 \\ +1 & -1 \end{vmatrix} \quad (2)$$

and also that, $$w(4) = \begin{vmatrix} +1 & +1 & +1 & +1 \\ +1 & -1 & +1 & -1 \\ +1 & +1 & -1 & -1 \\ +1 & -1 & -1 & +1 \end{vmatrix} \quad (3)$$

This construction technique is recursive since it obeys the equation $$f(m)=g(f(n)), \; m>n \quad (4)$$

for some functions f,g and indexes m,n, where m>n. In other words, the $m^{th}$ function, f, is created solely from an operation, g, on a previous version of f, namely f(n). A function is considered to be recursive if it obeys equation (4). By letting f=w, m=2n, one can see that g is defined by equation (1).

This construction technique permits multi-rate orthogonal signaling on a synchronous CDMA system, since the Walsh sequences of length n can support users at a channel symbol rate of $Rs_1$=Rc/n (where Rc is the chip rate), while the Walsh sequences of length 2n can support lower rate users of rate $Rs_2$=Rc/2n. In order to illustrate this point, let $w_{ij}(n)$ be the $j^{th}$ ±1 valued chip in the $i^{th}$ row of the code matrix. If only one subscript is used, $w_i(n)$, let that represent the $i^{th}$ row of the code matrix, or in other words, the $i^{th}$ PN code in the set having n chips in the vector. Clearly both i and j are integers ranging from 1 to n. When these codes are used for multi-rate CDMA operation, the users at the various rates are either perfectly correlated or are orthogonal, as is illustrated by FIG. 1a.

In FIG. 1a it can be seen that there is a choice of supporting n users at rate Rc/n, 2n users at rate Rc/2n, or a number of users between n and 2n at mixed rates. If, for example, a user employs code $w_1(n)$ at rate Rc/n, then codes $w_1(2n)$ and $w_2(2n)$ at rate Rc/2n may not be used, since they are not orthogonal with the user employing code $w_1(n)$ at rate Rc/n. Other users may employ codes $w_3(2n)$ and $W_4(2n)$ at rate Rc/2n since they are all mutually orthogonal, even though they are at different data rates.

However, there are several problems with the approach described in U.S. Pat. No. 5,751,761. First of all, if the Walsh codes are used directly then the spectral properties of the PN codes would be very poor. This is due to the fact that the codes are made up of very regular patterns as is illustrated by equation (3). Some codes are completely unspread, while others are spread with square waves whose frequencies are one, two, four, eight, etc. times the symbol rate. These users would have very limited immunity to jammers, and would not enjoy the benefits of being spread with a PN code of processing gain n or 2n (depending on their rate).

In U.S. Pat. No. 5,751,761, the approach used to avoid this problem is to apply a cover code to the code matrix. This amounts to multiplying every code in the set by a single randomizing vector of ±1 valued chips whose length is much larger than the channel symbol processing gain. So long as every code in the set is multiplied by the same cover code, the orthogonality of the set is retained, but the resulting set is made to appear more random.

However, a problem that arises when applying a cover code to the matrix is that the resulting randomized Walsh codes are not balanced. This means that, over any symbol period, the number of +1 valued chips and −1 valued chips are not equal to one another in most of the resulting PN codes. Balance in the code set is a very desirable property, since it implies that the codes are orthogonal to any DC offset in the receiver of the signal. In other words, if the chips are ±1 millivolts in the receiver, but there is a 2 millivolt DC offset in the signal at the input of the despreader, then the despreader would have to multiply the ±1 despreading code with an input signal having values of +3 and +1 millivolts. However, if the PN code is balanced over a symbol, then the DC offset will not affect the despreading process.

In general, and referring briefly to FIG. 1b, the approach used in U.S. Pat. No. 5,751,761 is a recursive approach, wherein the value of the nth output of y is created from a previous value of y, so long as n>0. In other words, past relationships are used to create new, current relationships between code elements.

As has been made apparent, the use of such a recursive technique to create PN code sets for use in multirate CDMA system can result in problems.

OBJECTS AND ADVANTAGES OF THE INVENTION

It is a first object and advantage of this invention to provide an improved technique for providing PN codes for use in a CDMA communications system having a plurality of users simultaneously operating at different data rates.

It is a further object and advantage of this invention to avoid the problems inherent on the prior art recursive techniques that apply a cover code to a code matrix in an attempt to make the code set appear more random.

It is another object and advantage of this invention to provide a non-recursive technique for constructing a series of mutually orthogonal sets of PN codes which support multirate signaling, wherein the series of sets of PN codes have the desirable properties that the constituent codes are balanced at all of the desired symbol rates, and that furthermore the constituent codes exhibit good spectral properties.

It is a still further object and advantage of this invention to provide a non-recursive technique for constructing a series of balanced PN code sets that can be used to advantage in multirate synchronous and quasi-synchronous CDMA systems, wherein the technique employs a permuted orthogonal matrix to modulate permuted orthogonal matrices to create balanced PN code sets that support multirate operation.

SUMMARY OF THE INVENTION

The foregoing and other problems are overcome and the objects and advantages of the invention are realized by methods and apparatus in accordance with embodiments of this invention.

A method is disclosed for constructing a series of mutually orthogonal sets of PN codes which support multirate signaling. This series of sets of PN codes has the desirable properties that the constituent codes are balanced at all of the desired symbol rates, and also exhibit good spectral properties (provide a data randomization function). Furthermore, this series of sets of PN codes permits efficient multicell operation, since any constituent code of one set appears to be approximately random relative to any constituent code of any other set. These improved codes are can be used to advantage in the forward channel (point-to-multipoint direction) of CDMA systems, but may also be employed in the reverse channel if the reverse link employs quasi-synchronous CDMA.

A non-recursive technique is disclosed for constructing a series of PN code sets that can be used for multirate synchronous and quasi-synchronous CDMA systems. The construction technique is superior to conventional techniques in that it produces PN codes that are balanced, and that furthermore do not require any synchronization of neighboring base stations. This approach may be characterized as using a permuted orthogonal matrix to modulate permuted orthogonal matrices to create PN codes that support multirate operation. Furthermore, the codes constructed using the method of this invention have very good spectral properties (if chosen properly) when the code length, n, is reasonably large.

A non-recursive method is provided for constructing balanced PN code sets for use in a CDMA communication system. The method includes steps of (a) applying a constrained permutation to a GxG ±1 valued matrix to form a modulation matrix M(G); and (b) using the modulation matrix M(G) to create a set of available PN codes for a first cell by modulating R unique nxn permuted code sets, $c^1(n)$ to $c^{(R)}(n)$ by successive scalar elements of M(G). The step of using the modulation matrix M(G) comprises a step of operating a scalar times matrix multiplier.

BRIEF DESCRIPTION OF THE DRAWINGS

The above set forth and other features of the invention are made more apparent in the ensuing Detailed Description of the Invention when read in conjunction with the attached Drawings, wherein:

FIG. 1b is a simple block diagram depicting a recursive function generator, and which is useful in explaining a prior art Walsh code set generation technique;

FIG. 2 illustrates a timing diagram of various cell #1 and cell #2 Walsh codes used at rate Rc/n, and assuming that R=3;

FIG. 3 is an illustration of permissible permutations of a Walsh matrix to obtain M(G), where G=8, and where the notation $w_{1:8,j}(8)$ indicates the jth column of w(8), by including the elements of rows 1:8 and column j;

FIG. 4a depicts the details of a jth scalar modulator working on the sequence of permuted matrices for cell #1;

FIG. 4b illustrates a procedure for generating the codes for cell #1 by modulation the sequence of permuted cell #1 n x n code sets with the G rows of the modulation matrix M(G);

FIG. 5 is a diagram showing code sequences for use in cell #1 for a case described by a first example (Example 1);

FIG. 6a depicts an Equation 10 useful in explaining a matrix used to modulate a sequence of permuted matrices for cell #1, in accordance with a second example (Example 2);

FIG. 6b is a diagram showing code sequences for use in cell #1 for a case described by the second example, where the boxes delineate the intended symbol boundaries at various data rates;

FIG. 7 illustrates a timing diagram of various cell #1 and cell #2 Walsh codes used at rates Rc/n and Rc/2n, assuming that R=3, G=2, and the M(2) matrix employed in the first example;

FIG. 12 illustrates an exemplary 8x8 Walsh code matrix, an exemplary reordering code, and the resultant reordered Walsh code matrix, in accordance with the invention described in the above-referenced commonly assigned U.S. patent application Ser. No. 09/328,546, filed Jun. 9, 1999, entitled "PN Code Selection for Synchronous CDMA";

FIG. 13 illustrates an exemplary inversion pattern for application to the reordered Walsh code matrix of FIG. 12, and the resultant inverted, reordered Walsh code matrix, in accordance with that invention.

DETAILED DESCRIPTION OF THE INVENTION

Figure 1A:
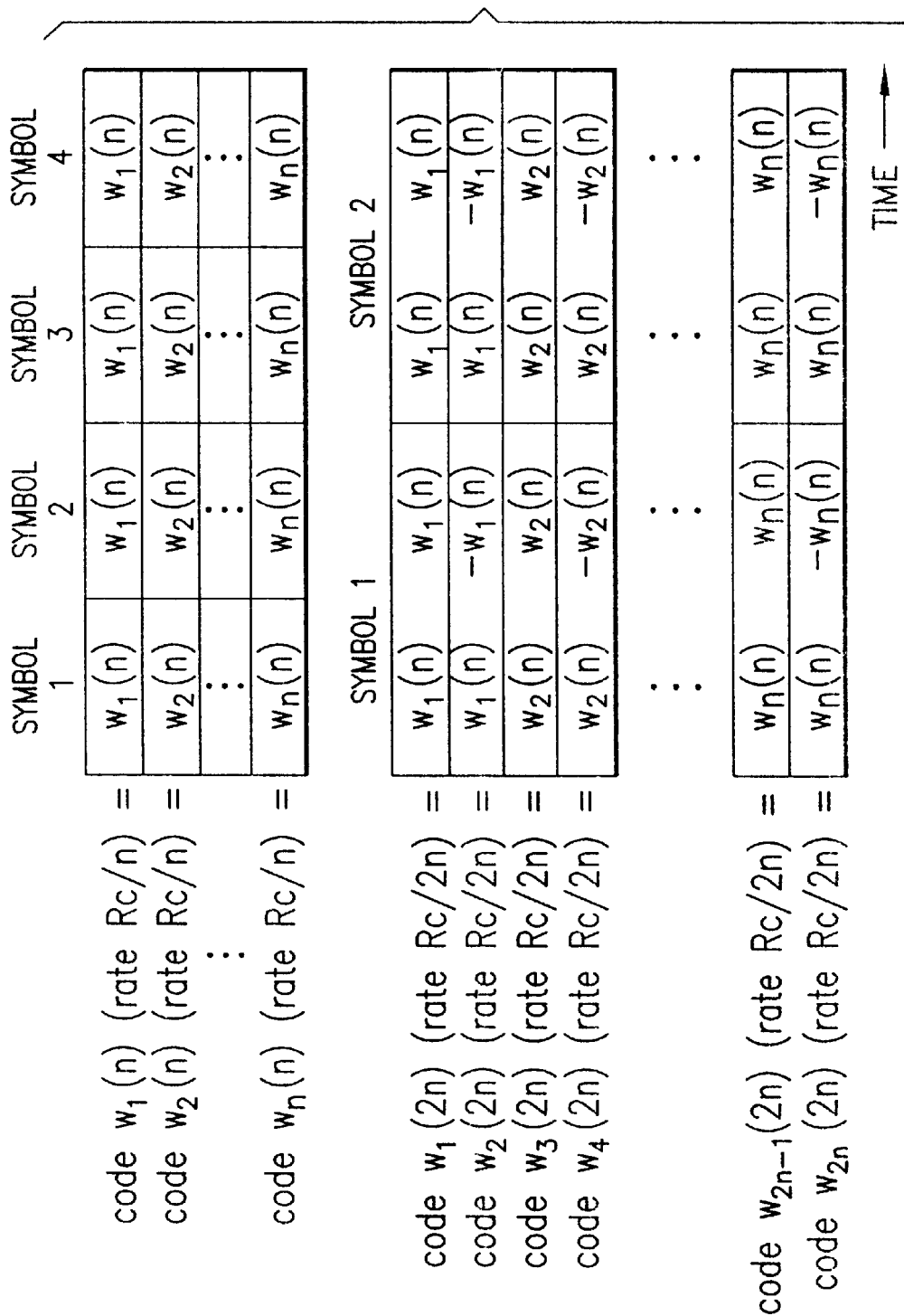
FIG. 1a depicts a conventional timing diagram of various Walsh codes used at rates Rc/n and Rc/2n.

Because of the desirability to provide mutually orthogonal PN codes that exhibit good spectral properties, and that are also balanced, a technique for generating n x n mutually orthogonal matrices was described in the above-referenced U.S. patent application Ser. No. 09/328,546, filed Jun. 9, 1999, entitled "PN Code Selection for Synchronous CDMA", by Leon Nieczyporowicz, Thomas Giallorenzi and Steven B. Perkins, which is incorporated by reference herein in its entirety.

In this method, described below in greater detail in reference to FIGS. 11, 12, 13 and 14, the standard Walsh codes are reordered using a pseudo-random reordering pattern. In other words, one starts with a code set w(n) having elements $w_{ij}(n)$, and then permutes the columns of w(n) in a random-like fashion to obtain a new code set matrix. Additional steps of permuting rows and inverting rows can also be employed to provide a code matrix which has the additional, appealing properties of having a reasonable peak-to-average power ratio when transmitting correlated data on each of the CDMA channels.

In accordance with the teachings of this invention the reordered code matrix is referred to as $c^{(k)}(n)$ to denote the $k^{th}$ reordering pattern of w(n), where it is assumed that the rows of w(n) were permuted and possibly inverted and the columns were permuted to obtain $c^{(k)}(n)$. The operations described do not change the fact that the rows of the matrix $c^{(k)}(n)$ are perfectly balanced. This implies that one of the rows will always be made up of all +1 values (or -1 values if it is inverted) since reordering the all +1 vector of w(n) does not change it. The all ones PN code of the set, $c^{(k)}(n)$, may be discarded, leaving n-1 PN codes which are perfectly balanced, mutually orthogonal, and which possess good spectral properties, if the $k^{th}$ reordering pattern is a good one.

Finally, it can readily be shown that in non-degenerate cases, the orthogonal matrix $c^{(k)}(n)$ is impossible to create using the cover code method of randomizing w(n), as described in, for example, the above-noted U.S. Pat. No. 5,751,761.

An additional benefit of the code generation method disclosed in the above-referenced U.S. patent application Ser. No. 09/328,546, filed Jun. 9, 1999, entitled "PN Code Selection for Synchronous CDMA", by Leon Nieczyporowicz, Thomas Giallorenzi and Steven B. Perkins, is that one can find, if n is large, many distinct reordering patterns for use in adjacent cells. For example, in an exemplary fixed wireless local loop telephone system a total of nineteen $c^{(k)}(n)$ sets can be employed, with n=128, so k=1, 2, . . . , 19. Each of the 19 sets is selected because of good spectral properties, and also because the shifted and non-shifted cross-correlation properties are good between any pair of codes in different sets, that is, $c^{(k)}_x(128)$ and $c^{(j)}_y(128)$ for all k j, where j,k=1, 2, . . . , 19, and x,y=1, 2, . . . , 127, and $c^{(k)}_{128}(128)$ is assumed to be the all +1 vector of length 128 for all k. Having 19 distinct code sets which appear random relative to each other, but which are perfectly orthogonal within any one set, permits one to employ a 19-cell code reuse pattern. This 19-cell code reuse pattern insures that no two cells are using the same code set, within two cells of one another, in a cellular grid. In a sectorized deployment one may employ a 19-sector code reuse pattern, or some other reuse pattern with a subset of the 19 sets if desired.

In contradistinction, in U.S. Pat. No. 5,751,761, the code reuse property is obtained by synchronizing adjacent base stations, and giving every base station a different phase of the cover code. This method not only has the disadvantage of unbalanced PN codes, but it also requires that the base stations all employ GPS receivers to obtain a common clock reference to synchronize the shifts of the long cover code.

In contrast, the codes obtained in accordance with the teachings of the above-referenced U.S. patent application Ser. No. 09/328,546, filed Jun. 9, 1999, entitled "PN Code Selection for Synchronous CDMA", by Leon Nieczyporowicz, Thomas Giallorenzi and Steven B. Perkins, does not require base station synchronization to insure that adjacent cell interference appears random.

A discussion is now made of enhancements to and extensions of the teachings found in the commonly assigned patent application U.S. patent application Ser. No. 09/328, 546, filed Jun. 9, 1999, entitled "PN Code Selection for Synchronous CDMA", by Leon Nieczyporowicz, Thomas Giallorenzi and Steven B. Perkins, in particular a non-recursive method for creating variable rate PN codes which are appropriate for use in synchronous and quasi-synchronous CDMA systems. This novel construction method will also be shown to have several advantages over the prior art approaches discussed above.

Disclosed below is a novel construction technique for creating PN codes for multirate synchronous and quasi-synchronous CDMA systems which have good spectral properties, are balanced, and that permit multicell operation. This method is shown to be a non-recursive extension of the codes disclosed in the above-referenced commonly assigned U.S. patent application Ser. No. 09/328,546, filed Jun. 9, 1999. In fact, the method of reordering or permuting the columns of a Walsh matrix are extended by using a reordered matrix to modulate the reordered matrices described in the above-referenced commonly assigned U.S. Patent Application.

A notation system was defined above that will be used now to explain the novel method for PN code set generation in accordance with this invention. As a reminder, $c^{(k)}(n)$ was defined to be the kth code matrix created from w(n) by permuting the rows and columns according to the $k^{th}$ permutation patterns, and by inverting some of the rows of the resulting matrix. Also, $c^{(k)}_{ij}(n)$ was defined to be the $j^{th}$ ±1 valued chip in the $i^{th}$ row of the code matrix, $c^{(k)}(n)$. Assume now that there are K useable permutation patterns that result in reasonable spectral properties and cross-correlation properties between members of different sets, so k=1, 2, . . . , K. Furthermore, assume that one desires to create Q=K/R distinct multirate code sets so that one may have a code set reuse of Q in a multicell deployment. Further assume that K is an integer multiple of Q so that R is an integer. It follows then that instead of having every cell or sector use a unique set $c^{(k)}(n)$, one can instead permit every cell or sector to use R of the K. Since code vectors $c^{(k)}_x(n)$ and $c^{(j)}_y(n)$ are not orthogonal if k j (where j,k=1, 2, . . . , K, and x,y=1, 2, . . . , n−1, and $c^{(k)}_n(n)$ is assumed to be the all +1 vector of length n for all k) , one cannot use codes from set k and set j at the same time and still maintain the in-cell users orthogonal. As a result, the code set construction method in accordance with the teachings of this invention may be considered to be based on a round-robin cycling of the code sets assigned to any particular cell or sector.

Consider the example shown in FIG. 2. In this figure, it is assumed that R=3 and K=21. This implies that there are Q=7 unique code patterns which can be used in a code reuse pattern of 7. FIG. 2 illustrates how, in the first cell, code sets 1, 2 and 3 are used in a round-robin fashion, while in cell 2, code sets 4, 5 and 6 are used in the same way. Since the cross-correlation properties of the various reordered sets are good by design, the relative phase offset of the symbols of one base station and another are irrelevant, and the base station-to-base station synchronization required in the prior art technique disclosed in U.S. Pat. No. 5,751,761 is made unnecessary.

A discussion is now made of how the round-robin code set can be made to support more than one data rate simultaneously, while maintaining the orthogonality of the users at the same and different rates.

In order to facilitate this discussion new notation is defined as follows. Let $R_{sH}$ be the highest symbol rate to be used by the system, where $R_{sH}$=Rc/n. Next, let the lowest desired symbol rate to be used by the system be denoted $R_{sL}$, where $G=2^g=R_{sH}/R_{sL}$, implying that the ratio of the highest to lowest rate is a power of 2, denoted G, or $2^g$. This suggests that $R_{sL}$=Rc/Gn=Rc/$2^g$n.

Next, let M(G) be a GxG modulation matrix whose elements are ±1 values, obtained by a constrained permutation of the columns of a Walsh matrix of the same size.

FIG. 3 illustrates a beginning point with a Walsh matrix of size G, and the permutation of the Walsh matrix to form M(G) under the constraints that only certain permutations are allowed. The first set of allowable permutations is to permute adjacent columns within pairs (meaning that columns 1 and 2, 3 and 4, 5 and 6, 7 and 8 may be permuted with each other, but 2 and 3, 4 and 5, 6 and 7 may not be permuted, for example). The next set of permissible permutations is to permute adjacent pairs of columns within groups of four columns (referred to as quads). This implies that in the second set of permissible permutations, columns 1 and 2 may be exchanged with columns 3 and 4, but not with 5 and 6 or 7 and 8, for example. In the next set of allowed permutations, groups of four columns may be swapped with adjacent groups of four columns. For example, columns 1, 2, 3 and 4 may be swapped with columns 5, 6, 7 and 8 as a group. If G>8, then this process may be extended until the final stage, where the first G/2 columns of w(G) may or may not be permuted with the second G/2 columns of w(G).

The permutations can be done in any order, such as columns within pairs, then column pairs within quads, and then column quads within column octals, or, by example, column pairs within quads, followed by columns within pairs, followed by column quads within octals, etc. This process can be extended to larger matrices, such as those having 16, or 32, or 64 columns. Any number of permutations can be done, from zero to every possible permutation within the above-defined constraints.

Referring to FIGS. 4a and 4b, next the modulation matrix M(G) is used to create the set of available PN codes for the first cell by modulating the R unique nxn permuted code sets, $c^{(1)}(n)$ to $c^{(R)}(n)$ stored in shift register 2, with the various elements of M(G) stored in shift register 3, using a scalar times matrix multiplier 4 found in a scalar modulator 1.

In FIGS. 4a and 4b it can be seen that the sequence of nxn permuted code sets which were allocated to cell #1 are modulated by the G rows of M(G). In FIG. 4b, each matrix, $c^{(k)}(n)$, k=1, 2,..., R, is multiplied with a single +1 element of the $M_j(G)$ row in the $j^{th}$ scalar modulator 1. Since M(G) is a GxG matrix, and the modulation sequence repeats once every G clocks, and since the sequence of input matrices repeats every R matrices (and there is one clock transition per matrix input), it follows that this forms an overall sequence which repeats once every RG matrices, or once every RGn chips. Thus the $i^{th}$ modulated matrix sequence output will be $$D^{(1)}_i = [M_{i1}(G)c^{(1)}(n), M_{i2}(G)c^{(2)}(n), \ldots ,$$
$$M_{i(j \bmod G)}(G)c^{(j \bmod R)}(n), \ldots ,$$
$$M_{iG}(G)c^{(R)}(n)] \quad (5)$$

where $D^{(1)}_i$ is an n x RGn matrix containing one cycle of the n PN codes corresponding to the $i^{th}$ modulating sequence of M(G). The notation j mod R implies the remainder after division of j-1 with R, plus 1, i.e., remainder ((j-1)/R)+1=j mod R. Note that for notational simplicity, the foregoing has not illustrated the size of the D matrix with an argument, since it is not a square matrix. Overall, the entire M(G) modulation matrix is used to create the matrix $$D^{(1)} = \begin{vmatrix} D^{(1)}_1 \\ \vdots \\ D^{(1)}_i \\ \vdots \\ D^{(1)}_G \end{vmatrix} \quad (6)$$

where $D^{(1)}$ is a Gn x RGn matrix having elements $D^1_1, \ldots, D^1_i \ldots D^1_G$, containing Gn PN codes having length RGn chips for use in cell #1. It follows that another Gn x RGn matrix, $D^{(2)}$ could be created for cell #2 using the permuted PN codes $c^{(R+1)}(n)$, $c^{(R+2)}(n)$, ..., $c^{(2R)}(n)$. In cell #2, for example, the same modulation matrix, M(G), can be used in create $D^{(2)}$, although in general it is possible for a unique M(G) matrix to be used in every cell. Similarly, for all Q of the cells having distinct code sets, one may, but is not required to, use M(G) to create code sets $D^{(i)}$, where i=1, 2, 3,..., Q.

In that the foregoing notation is somewhat complex, it may be helpful to further explain the teachings of this invention in accordance with the following two rather simple examples.

EXAMPLE 1

Assume first that R=3, so there are three unique permuted nxn Walsh matrices allocated to each cell. Limiting the discussion specifically to cell #1, the permuted matrices of interest are $c^{(1)}(n)$, $c^{(2)}(n)$ and $c^{(3)}(n)$. Next assume that there are only two data rates that the CDMA system is capable of operating in, i.e., rate $R_{sH}$=Rc/n and rate $R_{sL}$=Rc/2n. Thus, in this example G=2 and g=1. In this simple case, the modulation matrix M(G) need be only a 2x 2 matrix. Assume that one creates the modulation matrix M(2) by permuting the first (and only) two columns of w(2).

$$M(2) = \begin{vmatrix} 1 & 1 \\ -1 & 1 \end{vmatrix} \quad (7)$$

Next, the permuted modulation matrix is used to create $D^{(1)}$ for cell #1, which in this case is a 2n x 6n matrix.

$$D^{(1)} = \begin{vmatrix} c^{(1)}(n) & c^{(2)}(n) & c^{(3)}(n) & c^{(1)}(n) & c^{(2)}(n) & c^{(3)}(n) \\ -c(1)(n) & c^{(2)}(n) & -c^{(3)}(n) & c^{(1)}(n) & -c(2)(n) & c^{(3)}(n) \end{vmatrix} \quad (8)$$

and this matrix represents the codes which can be used at rates $R_{sH}$=Rc/n and $R_{sL}$=Rc/2n. This is illustrated in FIG. 5.

Since $D^{(1)}$ is 2n x 6n, this means that there are, in theory, 2n codes which may be used at rate $R_{sL}$=Rc/2n. Since the code sets $c^{(1)}(n)$, $c^{(2)}(n)$ $c^{(3)}(n)$ are balanced code sets, it follows that all of the codes in $D^{(1)}$ will be balanced. Furthermore, it is not difficult to show that $D^{(1)}$ has 2n mutually orthogonal rows at rate Rc/2n. Since the vectors $c^{(1)}(n)$, $c^{(2)}(n)$ and $c^{(3)}(n)$ are 1 x n vectors with all +1 elements, it follows that the $n^{th}$ row of $D^{(1)}$, namely $D^{(1)}_n$ is a 1 x 6n vector having all +1 values and thus should not be used because of its poor balance and poor spectral properties. Furthermore, $D^{(1)}_{2n}$ is a 1 x 6n vector having three groups of n "−1" values followed by n "+1" values respectively. This vector also has poor spectral properties and thus should not be used. The remaining 2n−2 rows of $D^{(1)}$ are mutually orthogonal, have perfect balance and have very good spectral properties.

If one desires to support users at $R_{sH}$=Rc/n then one may only assign the first n−1 rows of $D^{(1)}$, since the n row has poor spectral properties as discussed above, and the subsequent n rows are perfectly correlated or anti-correlated with at least one of the first n rows over the n-chip blocks at that rate. Thus, one can support n−1 users at rate $R_{sh}$, which is half the number of users supportable at half the rate. This emphasizes the fact that the technique provides, as do other approaches, for a conservation of aggregate throughput for the system, independent of the rate of the users in the system. A high rate user takes more of the aggregate system capacity than a low rate user.

EXAMPLE 2

The teachings of this invention are now further explained in accordance with a more complex, second example. Again, assume that R=3 and that the codes to be used in cell #1 are of concern. In this example, also assume that $R_{sL}=Rc/4n$, so that G=4 and g=2. To create M(4), assume that columns 3 and 4 of w(4) are swapped or exchanged, and then the column pair 1 and 2 is swapped with the column pair 4 and 3 to produce $$M(4) = \begin{vmatrix} 1 & 1 & 1 & 1 \\ -1 & 1 & 1 & -1 \\ -1 & -1 & 1 & 1 \\ 1 & -1 & 1 & -1 \end{vmatrix} \quad (9)$$

This matrix can then be used to modulate the sequence of permuted matrices for cell #1. Note that when G is very small, the reordered matrix M(G) does not appear very random. However, for G>4, the randomness of M(G) improves substantially. Since R=3 and G=4, it follows that $D^{(1)}$ will be 4n x 12n, as shown in the equation 10 in FIG. 6a.

The matrix shown in FIG. 6a represents the codes which can be used at rates $R_{sH}$=Rc/n, $R_s$=Rc/2n and $R_{sL}$=Rc/4n, as illustrated in FIG. 6b.

In FIG. 6b, the first line illustrates the fact that if the codes are to be used at a rate of Rc/n, then there are n−1 codes available (assuming the code based on $c^{(k)}_n(n)$ is eliminated), namely the ones modulated by $M_1(4)$. At a rate of Rc/2n, there are 2n−2 codes available, namely those based on $M_1(4)$ and $M_2(4)$. Again, the two codes based on $c^{(k)}_n(n)$ are eliminated as in the Example 1. Finally at a rate of Rc/4n, there are 4n−4 codes available. At this rate, the codes based on every row of M(4) are utilized.

The system illustrated in this Example 2 is capable of supporting Rc(n−1)/n symbols per second, independent of the rate of the users. This may equate to n−1 users at Rc/n, 4n−4 users at Rc/4n, or some mix of the rates in between.

To assign codes, it is noted that at the various rates some care should be taken to insure that code pairs which are perfectly correlated or anti-correlated are not assigned to two users at the same time. If one wishes to support users at $R_{sH}$=Rc/n, then one may only assign the first n−1 rows of $D^{(1)}$ since the $n^{th}$ row has poor spectral properties, as discussed above, and the subsequent n rows are perfectly correlated or anti-correlated with at least one of the first n rows over the n-chip blocks at that rate. At rate Rc/2n, one can assign 2n−2 of the first 2n rows of $D^{(1)}$ and so forth. If one wishes to have code $D^{(1)}$ active at rate Rc/n, where $1 \leq j \leq n-1$, then one cannot assign codes $D^{(1)j+n}$, and $D^{(1)}_{j+2n}$ and $D^{(1)}_{j+3n}$ since they are either perfectly correlated or anti-correlated at rate Rc/n. If, on the other hand, one wishes to use code $D^{(1)}_j$ at a rate of Rc/2n, then one can also use $D^{(1)}_{j+n}$, since it is orthogonal to $D^{(1)}_j$ at the Rc/2n rate. However, in this case one cannot also use $D^{(1)}_{j+2n}$ and $D^{(1)}_{j+3n}$, since they are perfectly correlated or anti-correlated at the Rc/2n rate. If one wishes to not use code $D^{(1)}_{j+n}$, at rate Rc/2n, but instead to use it at a rate of Rc/4n, then one may use both $D^{(1)}_{j+n}$ and $D^{(1)}_{j+3n}$ at Rc/4n. Similarly, if $D^{(1)}_j$ is not used at any rate above Rc/4n, then both $D^{(1)}_j$ and $D^{(1)}_{j+2n}$ are available for use at Rc/4n, even if $D^{(1)}_{j+n}$ or $D^{(1)}_{j+3n}$ are active at Rc/2n since they are orthogonal.

One important point to note is that because $D^{(k)}$ is not a function of itself in any way, the code construction technique described in accordance with this invention is not recursive. Stated differently, using the code set construction technique described above, knowledge of a code set of some size is not sufficient to generate a mutually orthogonal set of a larger size. Instead, to construct a larger code set would require a new M(2G) matrix to be created and re-permuted in a manner appropriate for a 2Gx2G matrix.

In addition, the modulation of an orthogonal code set with another PN code, as was described by example in U.S. Pat. No. 5,751,761, is distinct from the technique in accordance with this invention, since in the prior art technique every code is modulated by the same PN cover code. In contradistinction, in the code set construction technique in accordance with the teachings of this invention, there is not a single cover code used for every orthogonal code. Instead, one of G of the rows of M(G) are used on each of the codes within the $c^{(k)}(n)$ sequence at the lowest rates, and the codes are not uniquely determined by the $c^{(k)}(n)$ sequence alone. It is only the product of the M(G) row with the $c^{(k)}(n)$ sequence that provides the unique codes. In addition, the M(G) sequence iterates only once every n chips, unlike the conventional cover code approach.

EXAMPLE 1 (REVISITED)

In Example 1, codes were constructed to support R=3 and G=2 for the cell #1. To now emphasize the fact that these codes can be used in a multicell environment, with no base station synchronization required, a consideration is now made of the effect of interference from cell #2 on cell #1. In FIG. 7 there is illustrated one possible timing relationship between the codes of cells #1 and #2 (note the shift in time).

Since the underlying reordered matrices, $c^{(k)}(n)$ are all uniquely permuted and are designed to have cross-correlations similar to random codes for any offset, it follows that for any shift of the resulting codes $D^{(1)}$ and $D^{(2)}$, what is obtained is a random-like interference. In other words, this series of code sets permits efficient multicell operation since any constituent code of one set appears to be approximately random relative to any constituent code of any other set. Thus, the use of the teaching of this invention achieves the desirable property that one need not time-synchronize the base stations using sets $D^{(k)}$, k=1, 2, ..., Q. Furthermore, it can be seen that if R=3, Q=7 and K=21, then this code scheme will support seven unique code sets, the first two of which are shown in FIG. 7.

Having thus described a presently preferred method for creating orthogonal code sets for a multirate CDMA system, several implementation considerations will now be discussed.

Figure 8:
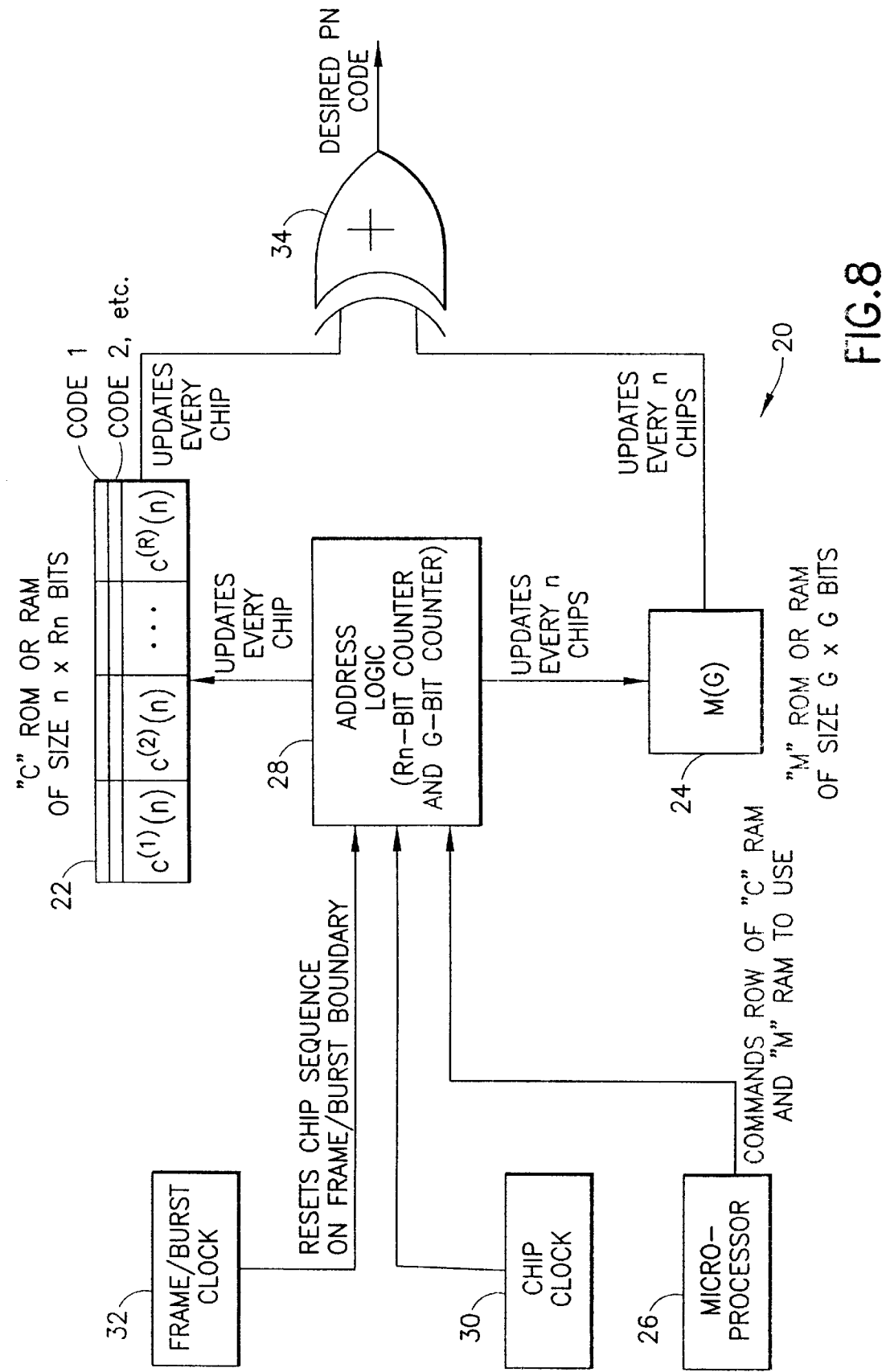
FIG. 8 is a block diagram of a PN code generation circuit.

The approach to creating codes as described above produces codes which may appear to be rather complex at first glance. In contrast, it should be noted that there is a relatively straightforward and compact way to store the appropriate code set in a subscriber unit or user terminal. FIG. 8 illustrates one suitable embodiment of the PN code generator 20 for a subscriber unit.

FIG. 8 shows that the PN code generator 20 includes two memories 22 and 24 implemented in one or two ROMs or, more typically, non-volatile random access memories (RAMs) so that the code matrices may be changed in the field, if necessary. These two memories 22 and 24 are referred to as the "C" ROM or RAM and the "M" ROM or RAM, respectively. If the subscriber unit of interest resides in cell #q, where q=1, 2, ..., Q, the permuted sequence of sets, $c^{(k)}(n)$ where k=(q−1)R+1, (q−1)R+2, ..., (q−1)R+R, is stored in the "C" memory 22, which is thus of size n x Rn bits. The M(G) matrix is stored in the G x G bit "M" memory 24. The actual code to be used may then be commanded by a microprocessor 26 via an Address Logic block 28, i.e., which row of the "C" memory 22 to read and which row of the "M" memory 24 to read. The Address Logic block 28 then uses two internal counters, which are clocked by a chip clock 30 and which are reset by a frame/burst clock 32, to insure that the PN codes of all users have the correct phase. The Address Logic block 28 addresses successive chip locations across the Rn-bit row of the "C" memory 22 which was previously commanded by the microprocessor 26. Every time an n-bit chip counter rolls over, it clocks a G-bit counter which is used to select the current bit of the appropriate row of the "M" memory 24. Thus the "M" memory 24 outputs the same bit for n successive chips and then iterates. The entire state machine rolls over every RGn chip clock periods, which represents the repeat length of the synthesized code. Since the length of the frame or burst of a particular system may not correspond to an integer number of RGn chip-periods, it follows that the state machine will be reset to the zero phase every frame or burst. This will provide the desirable feature that since in a synchronous or quasi-synchronous CDMA system, the users will be frame/burst synchronous and, since the PN code sequences for every user will reset every frame/burst, users will quickly resynchronize if for any reason their chip clock cycle slips.

It is noted with regard to the assumed binary arithmetic in FIG. 8 that the values stored in the memories 22 and 24 have binary values 0 and 1. These bits are exclusive ORed with gate 34 to create a 0 or 1 chip value in each chip period, in other words the desired PN code. It is assumed that in the subsequent modulation stages the 0 and 1 valued chip is remapped to a −1 and +1 valued chip during the modulation process. It can thus be appreciated that the Exclusive OR gate 34 provides the scalar times matrix multiplication function 4 described previously in FIG. 4a, the "C" memory 22 corresponds to the shift register 2 of FIG. 4a, and the "M" memory 24 corresponds to the shift register 3 of FIG. 4a.

Figure 9:
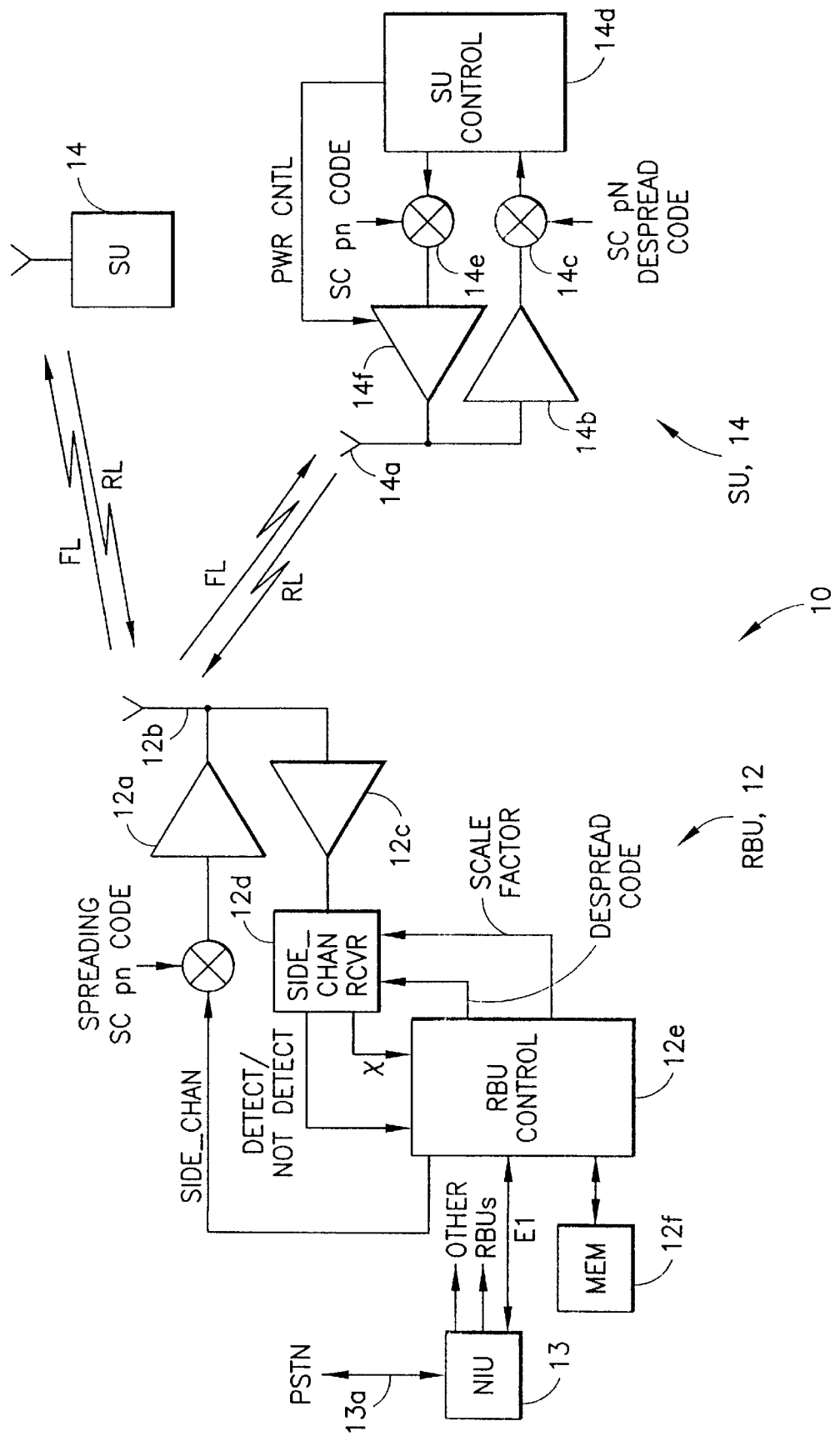
FIG. 9 is a simplified block diagram of a synchronous, spread spectrum CDMA fixed wireless communications system in accordance with an embodiment of this invention.

FIG. 9 illustrates a Fixed Wireless System (FWS) 10 that is suitable for practicing this invention. Specifically, the FWS 10 employs direct sequence spread spectrum based CDMA techniques over an air link to provide local access to subscribers, and offers very high quality, highly reliable service. The FWS 10 is a synchronous CDMA (S-CDMA) communications system wherein forward link (FL) transmissions from a base station, referred to also as a radio base unit (RBU) 12, for a plurality of transceiver units, referred to herein as user or subscriber units (SUs) 14, are symbol and chip aligned in time, and wherein the SUs 14 operate to receive the FL transmissions and to synchronize to one of the transmissions. Each SU 14 also transmits a signal on a reverse link (RL) to RBU 12 in order to synchronize the timing of its transmissions to the RBU 12, and to generally perform bidirectional communications. The FWS 10 is suitable for use in implementing a telecommunications system that conveys multirate voice and/or data between the RBU 12 and the SUs 14. As was made evident above, it is not necessary that the RBUs 12 be synchronized to one another, when employing the orthogonal PN code sets in accordance with this invention.

The RBU 12 includes circuitry for generating a plurality of user signals (USER_1 to USER_n), which are not shown in FIG. 1, and a synchronous side channel (SIDE_CHAN) signal that is continuously transmitted. Each of these signals is assigned a respective PN spreading code and is modulated therewith before being applied to a transmitter 12a having an antenna 12b. When transmitted on the FL the transmissions are modulated in phase quadrature, and the SUs 14 are assumed to include suitable phase demodulators for deriving in-phase (I) and quadrature (Q) components therefrom. The RBU 12 is capable of transmitting a plurality of frequency channels. By example, each frequency channel includes up to 128 code channels, and has a center frequency in the range of 2 GHz to 3 GHz.

The RBU 12 also includes a receiver 12c having an output coupled to a side channel receiver 12d. The side channel receiver 12d receives as inputs the spread signal from the receiver 12c, a scale factor signal, and a side channel despread pn code. These latter two signals are sourced from a RBU processor or controller 12e. The scale factor signal can be fixed, or can be made adaptive as a function of the number of SUs 14 that are transmitting on the reverse channel. The side channel receiver 12d outputs a detect/not detect signal to the RBU controller 12e for indicating a detection of a transmission from one of the SUs 14, and also outputs a power estimate value χ. A read/write memory (MEM) 12f is bidirectionally coupled to the RBU controller 12e for storing system parameters and other information, such as SU timing phase information and power estimate values.

A Network Interface Unit (NIU) 13 connects the RBU 12 to the public network, such as the public switched telephone network (PSTN) 13a, through analog or digital trunks that are suitable for use with the local public network. The RBU 12 connects to the NIU 13 using E1 trunks and to its master antenna 12b using a coaxial cable. The SU 14 communicates with the RBU 12 via the radio interface, as described above.

Figure 10:
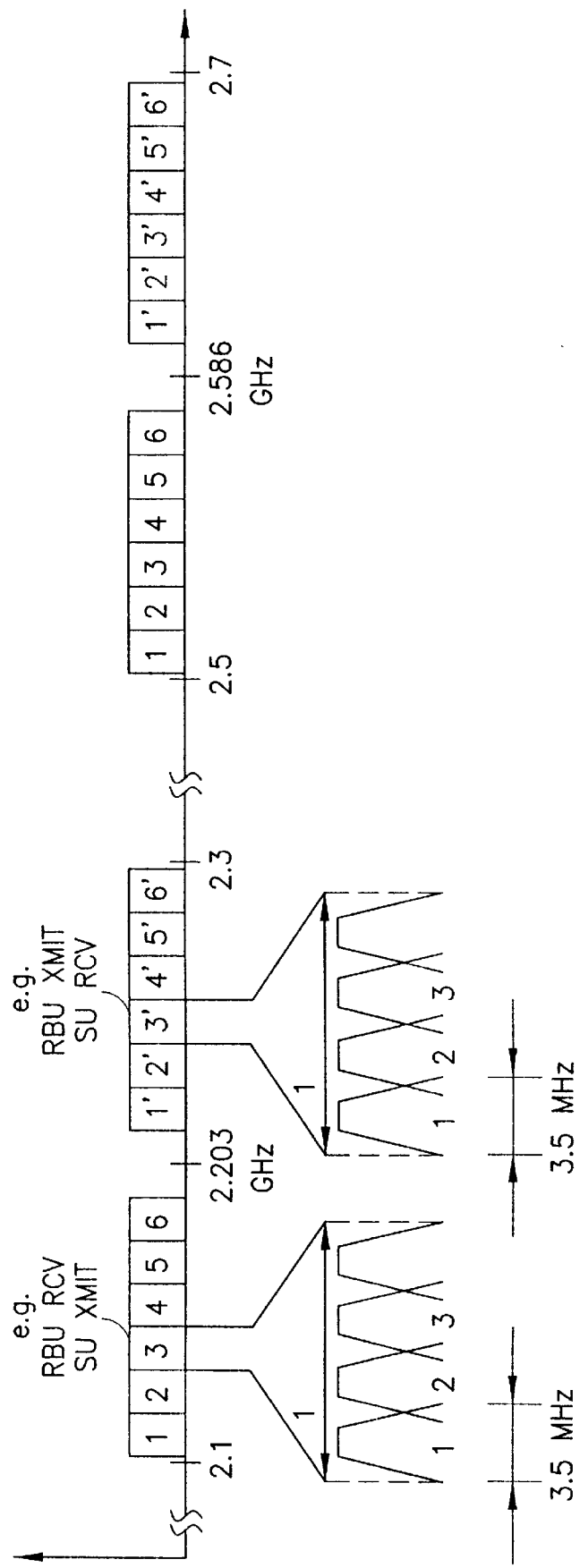
FIG. 10 is an exemplary frequency allocation diagram of the system of FIG. 9.

In the illustrated embodiment the SU-RBU air link provides a separate 2.72 MHz (3.5 MHz including guardbands) channel in each direction separated by either 91 MHz or 119 MHz of bandwidth. The nominal spectrum of operation is 2.1–2.3 GHz or 2.5–2.7 GHz. However, the system is designed such that the frequency can be varied from 1.8 to 5 GHz provided the spectral mask and separation between transmit and receive frequencies is maintained as per ITU 283.5 specification. As per the ITU 283.5 specification, there are a total of 96 frequency pairs allowed, as shown in FIG. 10. By example, the RBU 12 may transmit in the 3' frequency band and receive in the 3 frequency band, and the SU 14 transmits in the 3 frequency band and receives in the 3' frequency band.

In accordance with the teachings of the invention described in the above-referenced commonly assigned U.S. patent application Ser. No. 09/328,546, filed Jun. 9, 1999, entitled "PN Code Selection for Synchronous CDMA", by Leon Nieczyporowicz, Thomas Giallorenzi and Steven B. Perkins, the spectral properties of the Walsh codeset are improved by re-ordering the columns of the Walsh codeset matrix.

In the Walsh codeset matrix (whether reordered or scrambled), one column is all ones. In the normal operation of the synchronous CDMA system some correlated data may occur (e.g., a synchronization pattern, a particular silence pattern from a voice encoder, etc.). To overcome this problem some of the rows of the Walsh matrix may be inverted. This prevents the all ones column from resulting in a large correlation peak in the composite signal, which may cause a problem in the presence of non-linear impairments (i.e. clipping).

Within the reordered Walsh set the codes have different auto-correlation and cross-correlation properties. In synchronous CDMA systems there may exist an asynchronous channel (e.g., the side channel) to synchronize users who are new to the system, or those that have lost synchronization, or there may be some channels which have a reasonable probability of operating as or becoming asynchronous. To account for this, it is desirable to create a Walsh codeset (whether reordered or scrambled) which contains a number of codewords in the set which have good auto-correlation and cross-correlation properties over all timing offsets.

An important aspect is the reordering the Walsh codeset, as opposed to simply scrambling the Walsh codeset. As was described previously, scrambling the Walsh codeset is typically accomplished by generating another PN code (such as the above-referenced cover code) of the same length as the Walsh code, or a larger length, and then XOR'ing each code in the Walsh set with the cover code.

However, and in accordance with the teachings of the commonly assigned Patent Application referred to above, reordering the Walsh codeset is accomplished by exchanging columns of the Walsh codeset matrix, and also possibly inverting one or more of the codewords in the codeword set to avoid degradation due to correlated data.

Through the reordering operation the balanced properties of the Walsh codeset are maintained, and the number of +1's is equal to the number of −1's (or 0's) in each codeword (except for the all ones codeword). By inverting some of the codewords any degradation due to correlated data is reduced. Also, by allowing for asynchronous users the system becomes more robust and a greater flexibility is achieved.

Figures 11A, 11B, 11C, 14:
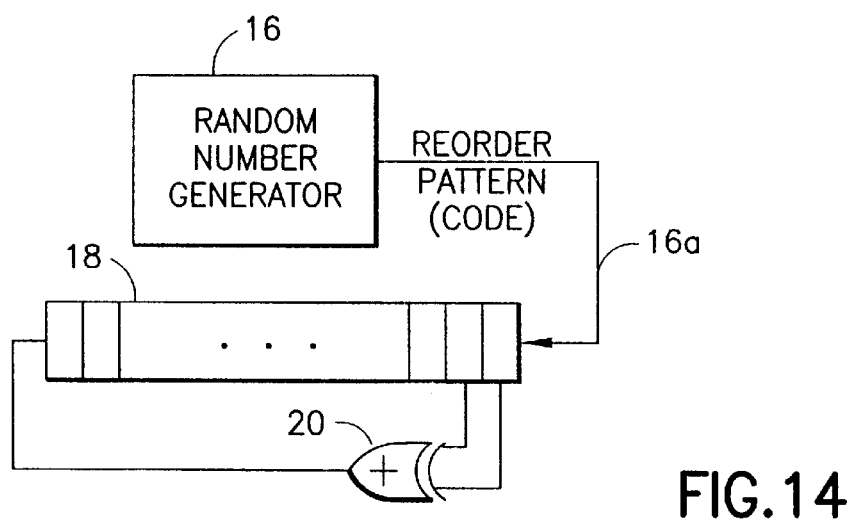
FIG. 11a illustrates an exemplary Hadamard (H) matrix.
FIG. 11b illustrates a Reordering Code (RC)
FIG. 11c illustrates a Reordered Hadamard (RH) code matrix in accordance with the invention described in the above-referenced commonly assigned U.S. patent application Ser. No. 09/328,546, filed Jun. 9, 1999, entitled "PN Code Selection for Synchronous CDMA", by Leon Nieczyporowicz, Thomas Giallorenzi and Steven B. Perkins.
FIG. 14 is a simplified block diagram of a reordering pattern or code generator and a shift register for reordering a PN code.

FIG. 11a illustrates an exemplary Hadamard matrix (treating a −1 as a 0). Reordered Hadamard codes are constructed by reordering the columns of the Hadamard matrix. For example, the Hadamard matrix (H) of FIG. 11a is reordered using the Reordering Code (RC) shown in FIG. 11b, and the resulting Reordered Hadamard (RH) code matrix is shown in FIG. 11c. Note that the third column has been moved to the first column position, and columns 1 and 2 have been shifted to the right by one column position.

In this case the Reordered Hadamard becomes a time shifted Hadamard with the codes renumbered. However, for Hadamards of order 8 or higher the reordering produces completely different codesets. To generate Reordering Codes, the states of an m-sequence generator can be lengthened by placing 128 at the end of the code. Randomly generated Reordering Codes can be employed as well. For example, FIG. 14 shows a block diagram of a random number generator 16 that outputs a Reordering Pattern or Code 16a to a shift register 18 having feedback through an XOR function 20.

Examining FIG. 11c it can readily be seen that one important advantage of the use of reordered Hadamard codes is that all of the codes, except the all ones code, are perfectly balanced.

If all of the transmitted signals in the CDMA system need to be spread then it is apparent that the all-ones codeword should be discarded. This reduces the number of usable codes by one. However, and as was described above, some of the rows may be inverted to prevent the all ones column from resulting in a large peak in the composite signal.

The reordering code can be generated using any random or pseudorandom sequence generator as shown in FIG. 14. For example, a random sequence from 1 to N (where N is the length of the Walsh code, or less) is generated. Then each of the columns of the Walsh code is reordered according to its location in the reordering pattern or code sequence, as shown in FIG. 12.

Note that one could also reorder by moving column 1 (of the Walsh code) to 3, 2 to 5, and so on. However, if one carefully examines the example shown in FIG. 12 it will become apparent that the reordered code is not a time shifted version of the original Walsh code.

It is also important to note that the resultant codeset cannot be achieved by simply applying a cover code to the original Walsh codeset, since the only way to achieve the all ones codeword is to use one of the codes of the Walsh set as the cover code, and using one code of the Walsh set as a cover code simply renumbers the codewords.

Figure 13:
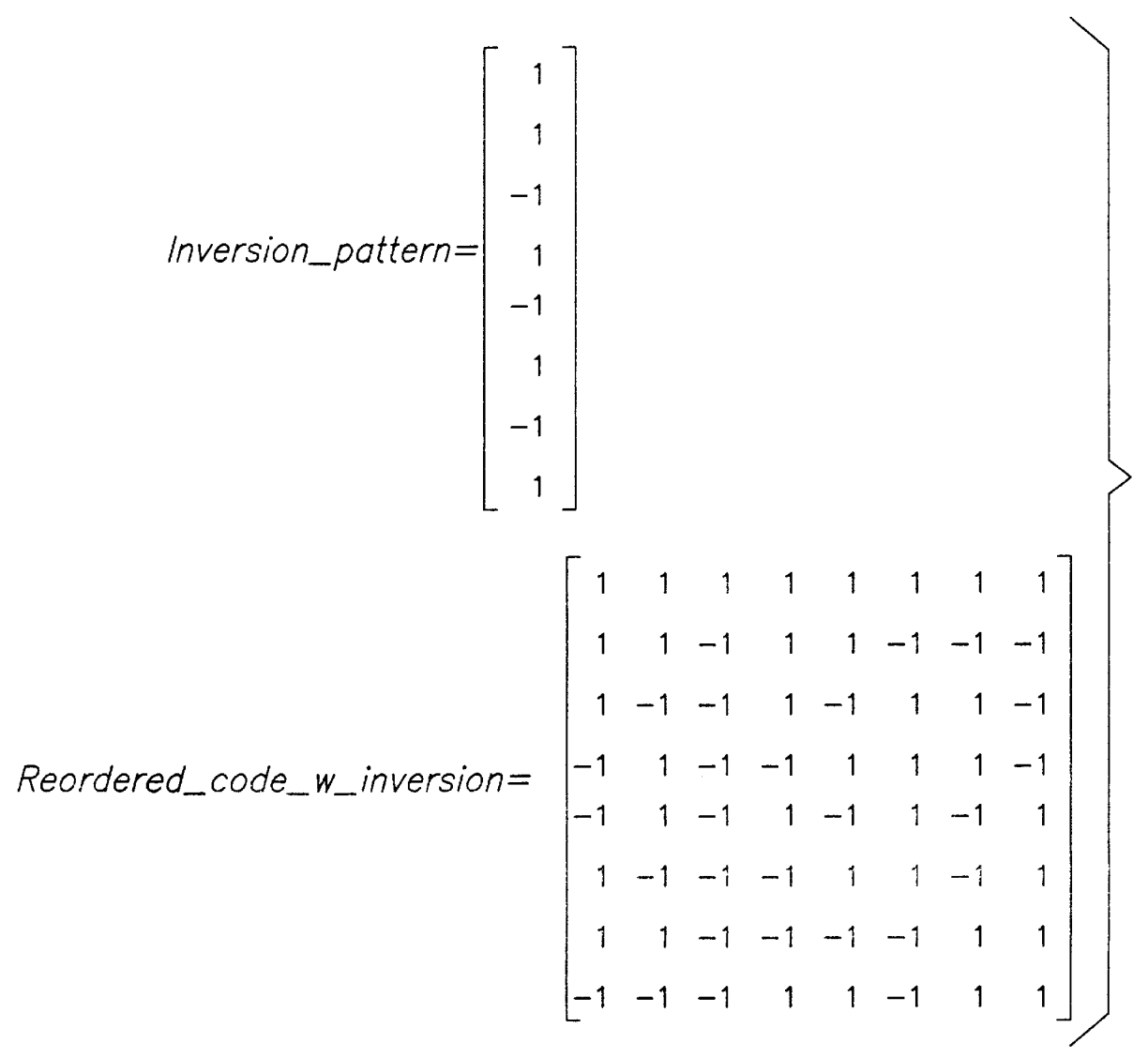

An important goal when inverting codewords is to provide a simple means to reduce the peak signal level when transmitting correlated data. Referring to FIG. 13, to invert codewords one first defines an inversion pattern. Then the inversion pattern is applied by multiplying each element in a row by its corresponding element in the inversion pattern. Thus row 1 in the reordered codeset is multiplied by row 1 in the inversion pattern, etc. For a case where all of the channels in the system 10 may be transmitting the same data (e.g., a sync pattern at the beginning of a frame), the resulting waveform is the sum of each column of the codeset. For the reordered codeset it is assumed that all users are transmitting a 1 for the data and, therefore, one can sum each column to determine that the transmitted waveform is:

tx_waveform_reordered_code=[0 0 0 0 8 0 0 0].

Next, examine the same conditions for the reordered codeset, with inversion, and the results are as follows:

tx_waveform_reordered_code_w_inversion=[2 2 −6 2 2 2 2 2].

Note that while no attempt was made to optimize the example inversion code, the peak of the transmitted signal is reduced from 8 to 6 (only the magnitude is of interest). While this case appears to give but a slight improvement, when operating with codesets of size 128 the peak can be reduced from 128 to approximately 75. This beneficially allows operation with correlated data without clipping.

In accordance with this invention the RBU 12 of FIG. 9, or some other processor, has the ability to generate the reordered (and possibly inverted) codes as shown in FIGS. 11a–11c, 12 and 13, and to then also modulate or multiply same by the permuted matrix M(G) as described in detail above, in order to generate the orthogonal PN codesets for use in the multirate FWL CDMA system 10.

While the invention has been particularly shown and described with respect to preferred embodiments thereof, it will be understood by those skilled in the art that changes in form and details may be made therein without departing from the scope and spirit of the invention.

What is claimed is:

1. A non-recursive method for constructing balanced PN code sets for use in a code division, multiple access (CDMA) communication system, comprising steps of:

applying a constrained permutation to a G x G ±1 valued matrix to form a modulation matrix M(G); and using the modulation matrix M(G) to create a set of available PN codes for a first cell by modulating R unique nxn permuted code sets, $c^{(1)}(n)$ to $c^{(R)}(n)$, by successive scalar elements of M(G).

2. A method as in claim 1, wherein the step of using the modulation matrix M(G) comprises a step of operating a scalar times matrix multiplier.

3. A method as in claim 1, wherein the step of using the modulation matrix M(G) uses the entire M(G) modulation matrix to create a matrix $$D^{(1)} = \begin{vmatrix} D^{(1)}_1 \\ \vdots \\ D^{(1)}_i \\ \vdots \\ D^{(1)}_G \end{vmatrix} \quad (6)$$

where $D^{(1)}$ is a Gn x RGn matrix, having elements $D^1_1, \ldots, D^1_i \ldots D^1_G$, containing Gn PN codes having length RGn chips for use in the first cell.

4. A method as in claim 3, wherein another Gn x RGn matrix, $D^{(2)}$, is created for a second cell using permuted PN codes $c^{(R+1)}(n)$, $c^{(R+2)}(n)$, . . . , $c^{(2R)}(n)$, and the same or another modulation matrix M(G).

5. A method as in claim 1, wherein said CDMA communication system is one of a multirate synchronous or quasi-synchronous CDMA system.

6. A method as in claim 1, wherein said step of applying a constrained permutation comprises a step of selectively permuting columns within column pairs, column pairs within column quads, column quads within column octals, and higher levels if present, in any order.

7. A non-recursive method for constructing balanced PN code sets for use in a code division, multiple access (CDMA) communication system, comprising steps of:

permuting the columns of a first orthogonal Hadamard matrix;

using the permuted Hadamard matrix to modulate second permuted orthogonal Hadamard matrices to create balanced PN code sets capable of supporting multirate CDMA operation; and assigning, as a function of transmission rate, at least one PN code from the balanced PN code sets to a user of the CDMA communication system.

8. A method as in claim 7, wherein said CDMA communication system is at least one of a multirate synchronous or quasi-synchronous CDMA system.

9. A method for improving the spectral properties of a PN codeset for use in a synchronous or quasi-synchronous CDMA communications system, comprising steps of:

providing a PN codeset matrix;

reordering the columns of the PN codeset matrix by exchanging columns in accordance with a reordering code to form a reordered matrix; and modulating the reordered matrix with a permuted modulation matrix.

10. A method as in claim 9, wherein the step of reordering further comprises a step of inverting at least one codeword of the reordered matrix.

11. A synchronous or quasi-synchronous CDMA communications system, comprising:

a radio base unit capable of bidirectional wireless multirate communications with a plurality of subscriber units; and a controller for reordering columns of a Hadamard codeset matrix by exchanging columns in accordance with a predetermined reordering code to produce a reordered pseudonoise (PN) codeset having improved spectral properties, and for then modulating the reordered matrix with a permuted modulation matrix to generate usable PN codes and assigning individual ones of the usable PN codes to requesting ones of the subscriber units as a function of subscriber unit data rate.

12. A system as in claim 11, wherein said controller further comprises means for inverting at least one codeword of the reordered matrix.

13. A non-recursive method for improving the spectral properties of PN codes derived from a Hadamard matrix for use in a synchronous or quasi-synchronous CDMA communications system, comprising steps of:

providing a Hadamard matrix;

reordering columns of the Hadamard matrix in accordance with a reordering code to generate a reordered Hadamard matrix; and multiplying elements of the reordered Hadamard matrix by a multiplication matrix obtained from a constrained permutation of a GxG Hadamard matrix.

14. A method as in claim 13, and comprising an initial step of generating the reordering code using one of a random or pseudo-random number generator.

15. A method as in claim 13, wherein the step of reordering further comprises steps of defining an inversion pattern, and inverting at least one codeword of the reordered Hadamard matrix using the inversion pattern.

16. A method as in claim 14, wherein the step of inverting includes a step of multiplying each element in a row of the reordered Hadamard matrix by a corresponding element of the inversion pattern.

17. A method as in claim 14, wherein the reordered Hadamard matrix is an i row by j column matrix, and wherein the inversion pattern is an i row by one column matrix.

18. A method for assigning balanced spreading codes for use in a synchronous or quasi-synchronous code division, multiple access (CDMA) communication system, comprising steps of:

non-recursively generating spreading codes by applying a constrained permutation to a GxG ±1 valued matrix to form a modulation matrix M(G) by selectively permuting columns within column pairs, column pairs within column quads, column quads within column octals, and higher levels if present, in any order; and using the modulation matrix M(G) to create a set of available spreading codes for a first cell by modulating R unique nxn permuted code sets, $c^{(1)}(n)$ to $c^{(R)}(n)$, by successive scalar elements of M(G), the available spreading codes being found in a matrix $$D^{(1)} = \begin{vmatrix} D^{(1)}{}_1 \\ \vdots \\ D^{(1)}{}_i \\ \vdots \\ D^{(1)}{}_G \end{vmatrix} \quad (6)$$

where $D^{(1)}$ is a Gn x RGn matrix, having elements $D^1{}_1, \ldots, D^1{}_i \ldots D^1{}_G$; and then assigning spreading codes for highest data rate users from only the first n rows of $D^{(1)}$, assigning spreading codes for second highest data rate users from only the first 2n rows of $D^{(1)}$ assigning spreading codes for third highest data rate users from only the first 4n rows of $D^{(1)}$, and so forth, thereby avoiding an assignment of perfectly correlated or anti-correlated spreading codes to two users simultaneously.

19. A method as in claim 18, wherein the step of using the modulation matrix M(G) comprises a step of operating a scalar times matrix multiplier.

20. A method as in claim 18, wherein another Gn x RGn matrix, $D^{(2)}$, is created for a second cell using permuted spreading codes $c^{(R+1)}(n)$, $c^{(R+2)}(n)$, . . . , $c^{(2R)}(n)$, and the same or another modulation matrix M(G).

* * * * *